A. J. Hull,
School Desk.
No. 99,440.     Patented Feb. 1, 1870.
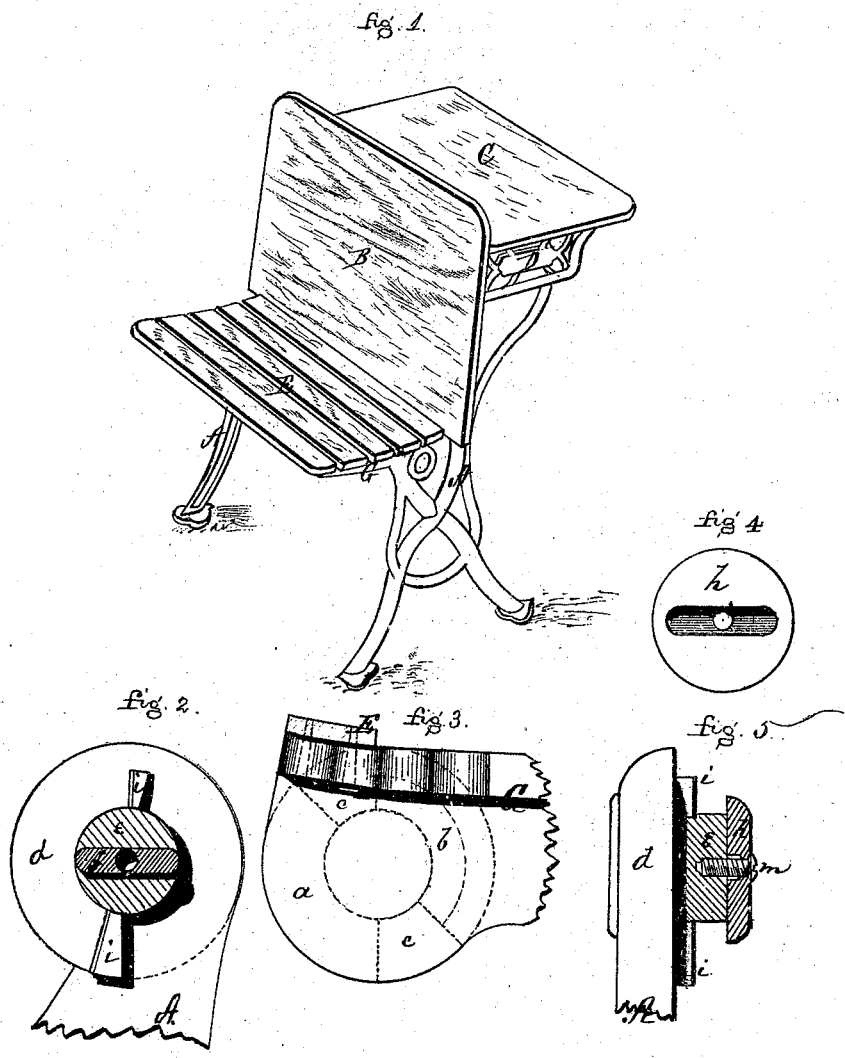

United States Patent Office.

A. J. HULL, OF STERLING, ILLINOIS, ASSIGNOR TO NOVELTY IRON WORKS MANUFACTURING COMPANY, OF SAME PLACE.

Letters Patent No. 99,440, dated February 1, 1870.

IMPROVED SCHOOL-DESK.

The Schedule referred to in these Letters Patent and making part of the same.

*To all whom it may concern:*

Be it known that I, A. J. HULL, of Sterling, in the county of Whitesides, and in the State of Illinois, have invented certain new and useful Improvements in School-Desks; and do hereby declare that the following is a full, clear, and exact description thereof, reference being had to the accompanying drawings, and to the letters of reference marked thereon, making a part of this specification.

The nature of my invention consists in the construction and arrangement of a joint or hinge, to be used in connecting the seat to a school-desk.

In order to enable others skilled in the art to which my invention appertains, to make and use the same, I will now proceed to describe its construction and operation, referring to the annexed drawings, in which—

Figure 1 is a perspective view of the combined school-desk and seat;

Figure 2 is an enlarged view of the inner side of that portion of the standard to which the seat is hinged;

Figure 3 is an enlarged side view of the inner end of the seat-supporting arm;

Figure 4 is an enlarged view of the inner side of the washer used in forming the joint or hinge; and Figure 5 is an enlarged front view of that portion of the standard to which the seat is hinged, showing, in section, the manner of securing the washer.

A A represent the standards, on which are secured the back B, desk C, and book-case D, all constructed in any of the known and usual ways.

E represents the seat, which is composed of a series of slats, secured on the upper side of two slightly-curved arms, G G.

These arms are enlarged and rounded on their inner ends, and the outer sides of these circular enlargements are provided with two segmental recesses, $a$ and $b$, forming, between said recesses, lugs $c$ $c$, as shown in dotted lines in fig. 3.

At a suitable height, on the front side of the standard A, is formed a circular projection, $d$, corresponding in size with the circular enlargement on the arm G.

In the centre of the projection $d$, on the inner side, is formed a hub, $e$, of the same length as the thickness of the enlarged inner end of the arm G, and of any suitable thickness to fit within a hole made in the centre of said enlargement on the arm G. Across the end of the hub $e$ is formed a bar or projection, $f$, as seen in fig. 2.

On the inner side of the circular projection $d$, close to the hub $e$, are formed two lugs, $i$ $i$, of the same thickness as the depth of the recesses $a$ $b$, above mentioned.

When the joint or hinge formed of the circular projection $d$, with its hub $e$, projection $f$, and lugs $i$ $i$, and the arm G, with its enlarged inner end, having recesses $a$ $b$ and lugs $c$ $c$, is put together, it will readily be seen that the lugs $c$ $c$ and $i$ $i$ form bearings for the seat to hold the same in proper position, both when it is let down and raised up against the back B.

When the arm G is placed in its position on the hub $e$, a washer, $h$, is put on the inside, said washer having a recess, in which the projection $f$, on the hub, fits. A screw, $m$, is then inserted through the centre of the washer $h$, and is screwed into the hub, so as to make a tight or loose joint, as required. The washer which thus completes the hinge will not move when the seat is moved up or down, and consequently the screw cannot come loose.

It is evident that the screw $m$ may be put in from the outside of the hinge, through the hub $e$, and be screwed into the washer $h$, and answer the same purpose.

Having thus fully described my invention,

What I claim as new, and desire to secure by Letters Patent, is—

1. The circular projection $d$, provided with the hub $e$, bar $f$, and lugs $i$ $i$, all substantially as and for the purposes herein set forth.

2. In combination with the above, the washer $h$, provided with a cavity or recess fitting over the bar $f$, for the purpose of keeping the screw $m$, which passes through the same, from turning, substantially as herein set forth.

In testimony that I claim the foregoing, I have hereunto set my hand, this 12th day of October, 1869.

A. J. HULL.

Witnesses:
LORENZO HAPGOOD,
A. C. MERRILL.